United States Patent
Heap et al.

(10) Patent No.: US 9,174,631 B2
(45) Date of Patent: Nov. 3, 2015

(54) METHOD AND APPARATUS FOR CONTROLLING TRANSMISSION SHIFTING IN A MULTI-MODE POWERTRAIN SYSTEM

(71) Applicant: GM GLOBAL TECHNOLOGY OPERATIONS LLC, Detroit, MI (US)

(72) Inventors: Anthony H. Heap, Ann Arbor, MI (US); Sean W. McGrogan, Ann Arbor, MI (US); Krunal P. Patel, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 96 days.

(21) Appl. No.: 13/925,800

(22) Filed: Jun. 24, 2013

(65) Prior Publication Data

US 2014/0378275 A1    Dec. 25, 2014

(51) Int. Cl.
| | |
|---|---|
| *B60W 10/184* | (2012.01) |
| *B60W 10/11* | (2012.01) |
| *B60W 10/02* | (2006.01) |
| *B60W 10/18* | (2012.01) |
| *B60W 10/105* | (2012.01) |
| *B60W 30/19* | (2012.01) |
| *F16H 61/04* | (2006.01) |
| *B60W 20/00* | (2006.01) |

(52) U.S. Cl.
CPC ............... *B60W 10/11* (2013.01); *B60W 10/02* (2013.01); *B60W 10/105* (2013.01); *B60W 10/18* (2013.01); *B60W 10/184* (2013.01); *B60W 20/20* (2013.01); *B60W 30/19* (2013.01); *F16H 61/0437* (2013.01); *Y10T 477/6394* (2015.01); *Y10T 477/644* (2015.01)

(58) Field of Classification Search
CPC .................. Y10T 477/6394; F16H 2061/0496
See application file for complete search history.

(56) References Cited

U.S. PATENT DOCUMENTS

| | | | | |
|---|---|---|---|---|
| 5,287,772 A | * | 2/1994 | Aoki et al. | 477/20 |
| 6,126,251 A | * | 10/2000 | Yoshii et al. | 303/152 |
| 7,377,872 B2 | * | 5/2008 | Jang | 475/275 |
| 7,637,846 B2 | * | 12/2009 | Tamai et al. | 477/110 |
| 7,976,427 B2 | * | 7/2011 | Yamamoto et al. | 477/4 |
| 8,744,653 B2 | * | 6/2014 | Hase et al. | 701/22 |
| 8,814,736 B2 | * | 8/2014 | Nedorezov et al. | 475/5 |
| 8,827,865 B2 | * | 9/2014 | Naqvi et al. | 477/5 |
| 2005/0054480 A1 | * | 3/2005 | Ortmann et al. | 477/6 |
| 2010/0137097 A1 | * | 6/2010 | Yim et al. | 477/3 |
| 2010/0304922 A1 | * | 12/2010 | Ohkubo et al. | 477/4 |

(Continued)

FOREIGN PATENT DOCUMENTS

JP    2005329926 A   * 12/2005

OTHER PUBLICATIONS

Machine translation of JP 2005-329926 A.*

(Continued)

*Primary Examiner* — Justin Holmes (57) ABSTRACT

A multi-mode transmission is configured to transfer torque among an internal combustion engine, torque machines and an output member. A method for controlling shifting in the transmission includes, in response to a command to execute a range shift in the transmission to a target transmission range: applying mechanical braking torque to reduce output torque from the transmission to off-load torque from an off-going clutch, operating in a pseudo-gear range to synchronize an oncoming clutch, and applying the oncoming clutch to establish the transmission in the target range.

6 Claims, 3 Drawing Sheets

(56) References Cited

U.S. PATENT DOCUMENTS

| | | | |
|---|---|---|---|
| 2011/0118920 A1* | 5/2011 | Kim | 701/22 |
| 2012/0059539 A1* | 3/2012 | Arnett et al. | 701/22 |
| 2012/0109479 A1* | 5/2012 | Ganley et al. | 701/70 |
| 2012/0265382 A1* | 10/2012 | Nefcy et al. | 701/22 |
| 2013/0292223 A1* | 11/2013 | Nedorezov et al. | 192/220 |
| 2013/0296100 A1* | 11/2013 | Nefcy et al. | 477/4 |

OTHER PUBLICATIONS

Development of Co-operative Control Algorithm for Parallel HEV with Electric Booster Brake during Regenerative Braking, Kim et al, IEEE 978-1-61284-246-9/11, Sep. 2011.*

* cited by examiner

METHOD AND APPARATUS FOR CONTROLLING TRANSMISSION SHIFTING IN A MULTI-MODE POWERTRAIN SYSTEM

TECHNICAL FIELD

This disclosure is related to dynamic system controls for multi-mode powertrain systems.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A multi-mode transmission is configured to transfer torque among an internal combustion engine, torque machines and an output member. A method for controlling shifting in the transmission includes, in response to a command to execute a range shift in the transmission to a target transmission range: applying mechanical braking torque to reduce output torque from the transmission to off-load torque from an off-going clutch, operating in a pseudo-gear range to synchronize an oncoming clutch, and applying the oncoming clutch to establish the transmission in the target range.

BRIEF DESCRIPTION OF THE DRAWINGS

One or more embodiments will now be described, by way of example, with reference to the accompanying drawings, in which.

DETAILED DESCRIPTION

Figure 1:
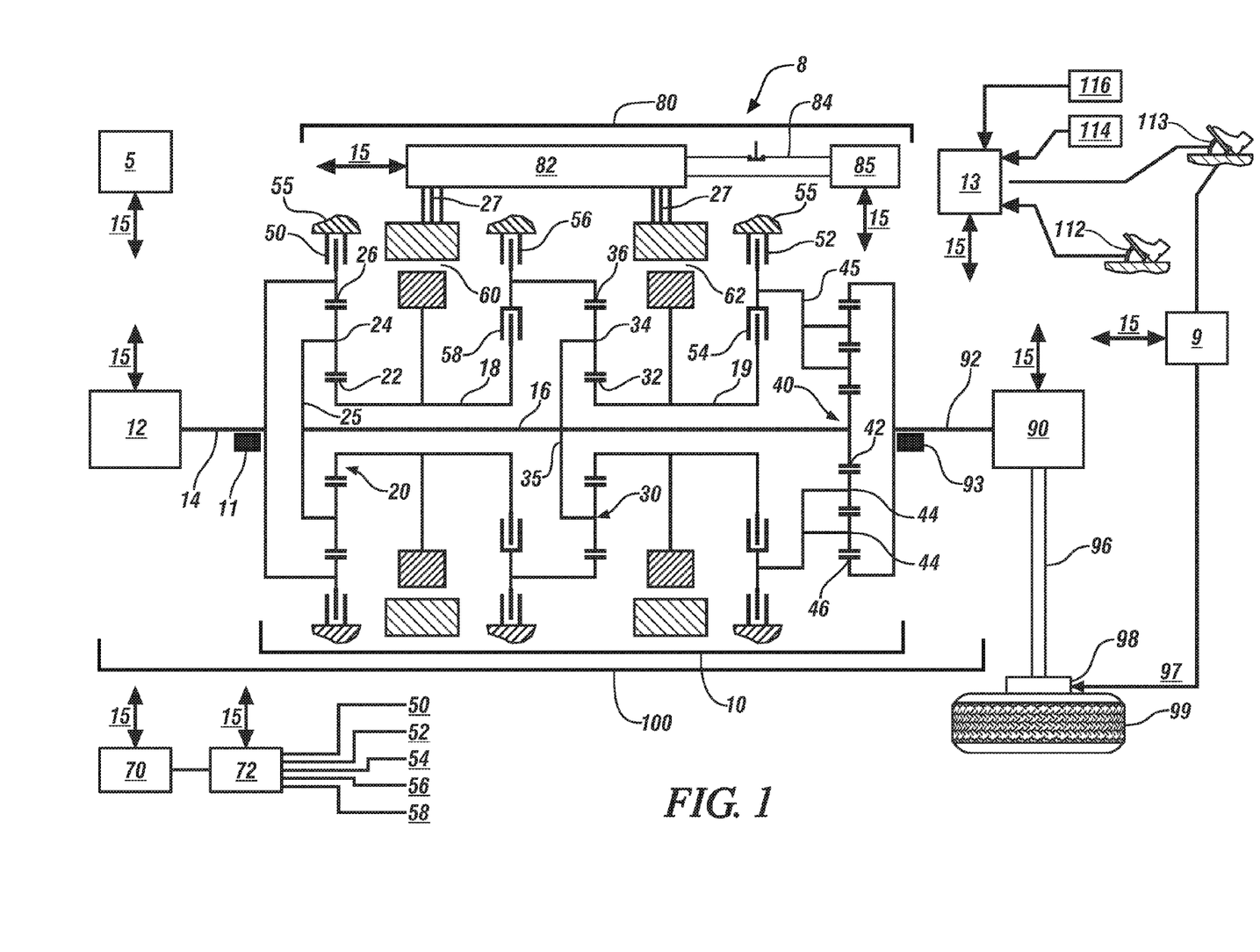
FIG. 1 illustrates an embodiment of a multi-mode powertrain system including an internal combustion engine, transmission, and a driveline, in accordance with the disclosure.

Referring now to the drawings, wherein the showings are for the purpose of illustrating certain exemplary embodiments only and not for the purpose of limiting the same, FIG. 1 depicts a non-limiting embodiment of a vehicle 8 including a multi-mode powertrain system 100 configured to transfer tractive torque to one or more ground wheels 99 for propulsion. The multi-mode powertrain system 100 includes an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and an output member 92 that couples to the driveline 90, and is configured to transfer torque therebetween. The engine 12, first and second torque machines 60, 62, and output member 92 transform potential or kinetic energy into measurable torque that can be transferred to and through the transmission 10. In one embodiment, the first and second torque machines 60, 62 are electric motor/generators that transform electric power to mechanical torque that is transferred to the transmission 10, including generating and reacting torque. The engine 12 transforms fuel into mechanical torque that can be transferred to the transmission 10. The output member 92 transforms vehicle inertia, vehicle momentum, and friction braking torque into mechanical torque that can be transferred to the transmission 10. It is appreciated that torque can be either positive or negative torque. The driveline 90 includes a differential system that couples via an axle 96 to one or more of the ground wheels 99, and is characterized by a final drive ratio that provides torque multiplication to the driven ground wheels. In one embodiment, the driveline 90 is configured in a rear-wheel drive arrangement. Alternatively, the driveline 90 can be configured to operate in a front-wheel drive arrangement, an all-wheel drive arrangement, a four-wheel drive arrangement, or another arrangement without limitation.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 can be any suitable high-voltage electrical energy storage device, e.g., a high-voltage battery, and preferably includes a monitoring system that provides a measure of electrical power supplied to the high-voltage electrical bus 84, including voltage and electric current.

The engine 12 preferably includes a multi-cylinder internal combustion engine selectively operative in several states to transfer torque to the transmission 10 via an input member 14, and can be either a spark-ignition or a compression-ignition engine. The engine 12 preferably includes an electronically controllable throttle device for metering intake air flow and a manifold pressure (MAP) sensor for monitoring intake manifold pressure. The engine 12 includes a crankshaft coupled to the input member 14 of the transmission 10. A rotational speed sensor 11 monitors crank angle and rotational speed of the input member 14. Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board algorithms, or using other suitable methods.

The first and second torque machines 60 and 62 are three-phase AC motor/generator machines, each including a stator, a rotor, and a position sensor, e.g., a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear set 30. Each of the resolvers is signally and operatively connected to the TPIM 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 rotatably connects to the driveline 90 to provide output power to the driveline 90 that is transferred to one or a plurality of the ground wheels 99 via differential gearing or another suitable device in this embodiment. The output power at the output member 92 is characterized in terms of an output rotational speed and an output torque. A transmission output speed sensor 93 monitors rotational speed and rotational direction of the output member 92. Each of the ground wheels 99 is preferably equipped with a sensor configured to monitor wheel speed to determine vehicle speed, and absolute and relative wheel speeds for braking control, traction control, and vehicle acceleration management. Each ground wheel 99 is preferably equipped with a controllable wheel brake 98 that can be any suitable configuration, e.g., a disc-brake configuration. Each wheel brake 98 applies a mechanical brake torque 97 for resisting rotation of the corresponding ground wheel 99, wherein a brake controller 9 commands the mechanical brake torque 97 in response to an operator-commanded brake pedal torque 113, which indicates a total braking effort the operator wants exerted on the ground wheels 99. The mechanical brake torque 97 can directly correspond to the brake pedal torque 113. Alternatively, the mechanical brake torque 97 can be responsive to the brake pedal torque 113 taking into account an electrical brake torque induced in the driveline 90 through the output member 92 due to electrically-induced reactive torque from one or both of the first and second torque machines 60, 62. The electrically-induced reactive torque from one or both of the first and second torque machines 60, 62 may be associated with regenerative braking.

The input torque from the engine 12 and the motor torques from the first and second torque machines 60, 62 are generated as a result of energy conversion from fuel or electrical potential stored in the electrical battery 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or electric power regeneration functionality to meet the motor torque commands. The power inverters include complementary three-phase power electronics devices, and each includes a plurality of insulated gate bipolar transistors (IGBTs) for converting DC power from the battery 85 to AC power for powering respective ones of the first and second torque machines 60 and 62, by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the battery 85 to charge and discharge the battery 85. The battery 85 is characterized in terms of a state of charge (SOC), and powertrain system operation comprehends maintaining the SOC of the battery 85 within a predetermined range.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. The controller 5 signally connects to the brake controller 9 via communications link 15 for coordinating operational control of vehicle braking as described herein. A user interface 13 is preferably signally connected to a plurality of devices through which a vehicle operator directs and commands operation of the powertrain system, including commanding an output torque request and selecting a transmission range. A vehicle operator directs and commands operation of the powertrain system. The output torque request includes an accelerator pedal torque 112 that is input from an accelerator pedal and the brake pedal torque 113 that is input from a brake pedal. Other operator commands include an operator-commanded transmission range 114 that is input from a range selector (PRNDL) and an operator-commanded vehicle speed 116 that is input from a cruise control system. The accelerator pedal torque 112 can range from a 0% level indicating no operator input to the accelerator pedal to a 100% level indicating a maximum operator input to the accelerator pedal, which an operator request for maximum output power from the powertrain system often referred to as a wide-open throttle (WOT) maneuver. The brake pedal torque 113 can range from a 0% level indicating no operator input to the brake pedal to a 100% level indicating an operator input to the brake pedal commanding a braking torque up to a maximum achievable braking torque that is required to achieve zero vehicle speed. The transmission range selector preferably provides for operator-selectable transmission ranges associated with effecting vehicle propulsion, e.g., R, D, and L, and operator-selectable transmission ranges associated with decoupling the torque generators including the engine 12 and first and second torque machines 60 and 62 from the output member 92, e.g., P and N. The transmission range selector may provide for a discrete number of operator-selectable transmission ranges indicating an operator-intended direction of travel of the vehicle of either a forward or a reverse direction, thus indicating a preferred rotational direction of the output member 92. It is appreciated that the vehicle may still move in a direction other than the indicated direction of operator-intended motion due to rollback caused by location of a vehicle, e.g., on a hill. The operator-selectable positions of a transmission range selector can correspond directly to individual transmission ranges described with reference to Table 1, or may correspond to subsets of the transmission ranges described with reference to Table 1. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including, e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals referred to as loop cycles, for example each 3.125, 6.25, 12.5, and 100 milliseconds during ongoing engine and vehicle operation. Alternatively, routines may be executed in response to occurrence of an event.

The multi-mode powertrain 100 is configured to operate in one of a plurality of powertrain states, including a plurality of transmission ranges and engine states to generate and transfer torque to the driveline 90. The engine states include an ON state and an OFF state. The engine is considered to be in the ON state when the engine is spinning. The engine ON state may include an all-cylinder state (ALL) wherein all cylinders are fueled and firing to generate torque, and a cylinder-deactivation state (DEAC) wherein a portion of the cylinders are fueled and firing to generate torque and the remaining cylinders are unfueled, not firing, and not generating torque. The engine ON state further includes a fuel cutoff (FCO) state, wherein the engine is spinning with all of the cylinders unfueled and not firing, and thus not generating torque. When the engine is in the OFF state, it is not spinning. In one embodiment, operating with the engine in the OFF state can be accomplished by grounding rotation of the input member to the transmission case using a clutch or similar device. By way of example, the powertrain system 100 shown with reference to FIG. 1 can operate with the engine 12 in the OFF state, i.e., not spinning by activating clutch C5 50 to ground rotation of the input member 14 to the transmission case 55 with speeds of the first and second torque machines 60, 62 controlled to achieve an output speed and output torque that are responsive to the output torque request. Alternatively or in addition, operating with the engine in the OFF state can be accomplished by controlling rotational speeds of the torque machines to achieve an input speed that is zero and an output speed and output torque that are responsive to the output torque request. The output torque request includes a positive output torque request leading to vehicle acceleration and/or steady-state cruising operation. The output torque request includes a negative output torque request leading to vehicle braking.

The transmission ranges include a plurality of neutral (neutral), fixed gear (Gear #), variable mode (EVT Mode #), electric vehicle (EV#) and transitional (EV Transitional Range# and Pseudo-gear #) ranges that are achieved by selectively activating the clutches C1 52, C2 54, C3 56, and C4 58 and C5 50. The pseudo-gear ranges are variable mode transmission ranges in which magnitude of torque output from the transmission to the driveline correlates to magnitude of the engine input torque, taking into account torque losses associated with torque-consuming components on the input member 14. The pseudo-gear range(s) can be employed as intermediate transmission ranges during shifts between EVT Mode ranges, and can also be employed as steady-state transmission operating states. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | ON(ALL/DEAC/FCO)/OFF | | | | | |
| Neutral 2 | ON(ALL/DEAC/FCO)/OFF | | | x | | |
| Neutral 3 | ON(ALL/DEAC/FCO)/OFF | | | | x | |
| PseudoGear 1 | ON(ALL/DEAC/FCO) | x | | | | |
| PseudoGear 2 | ON(ALL/DEAC/FCO) | | x | | | |
| Neutral | OFF | | | | | x |
| EVT Mode 1 | ON(ALL/DEAC/FCO) | x | | x | | |
| EVT Mode 2 | ON(ALL/DEAC/FCO) | x | | | x | |
| EVT Mode 3 | ON(ALL/DEAC/FCO) | | | x | x | |
| EVT Mode 4 | ON(ALL/DEAC/FCO) | | | x | x | |
| EV Transitional State 1 | OFF | x | | | | x |
| EV Transitional State 2 | OFF | | | x | | x |
| Gear 1 | ON(ALL/DEAC/FCO) | | | x | x | x |
| Gear 2 | ON(ALL/DEAC/FCO) | x | x | | x | |
| Gear 3 | ON(ALL/DEAC/FCO) | | | x | x | x |
| EV1 | OFF | x | | x | | x |

TABLE 1-continued

| Range | Engine State | C1 | C2 | C3 | C4 | C5 |
|---|---|---|---|---|---|---|
| EV2 | OFF | x | | | x | x |
| EV3 | OFF | | x | | x | x |
| EV4 | OFF | | | x | x | x |
| EV Transitional State 3 | OFF | x | x | | | x |
| Neutral | ON(ALL/DEAC/FCO)/OFF | | | | x | x |
| PseudoGear 3 | ON(ALL/DEAC/FCO) | x | x | | | |
| Neutral | OFF | | | x | | x |
| Neutral | OFF | | | | x | x |

The engine 12 operates in the ON state in one of the all-cylinder state and the cylinder deactivation state. The cylinder deactivation state is preferred during low engine load operating conditions to reduce pumping losses, thus reducing fuel consumption and emissions. Operation in the all-cylinder state is required at high engine load operating conditions to meet an output torque request.

The vehicle described with reference to FIG. 1 is controlled in response to operator commands under various operating conditions to transfer torque to an output member coupled to a ground wheel. This includes controlling transmission range downshifting during vehicle braking. Initially some or all of the braking effort is accomplished by applying powertrain braking. In response to a command to execute a range shift in the transmission to a target transmission range, mechanical braking torque is applied and ramped up to continue to deliver the operator braking torque request as dictated by the brake pedal position while off-loading torque from an off-going clutch. The transmission operates in a pseudo-gear range to synchronize an oncoming clutch. Upon synchronizing and filling the oncoming clutch, regenerative braking torque ramps up in response to a decrease in the mechanical braking torque and coincident with increasing torque capacity of an oncoming clutch associated with the target transmission range, and the transmission operates in the target range.

Figure 2:
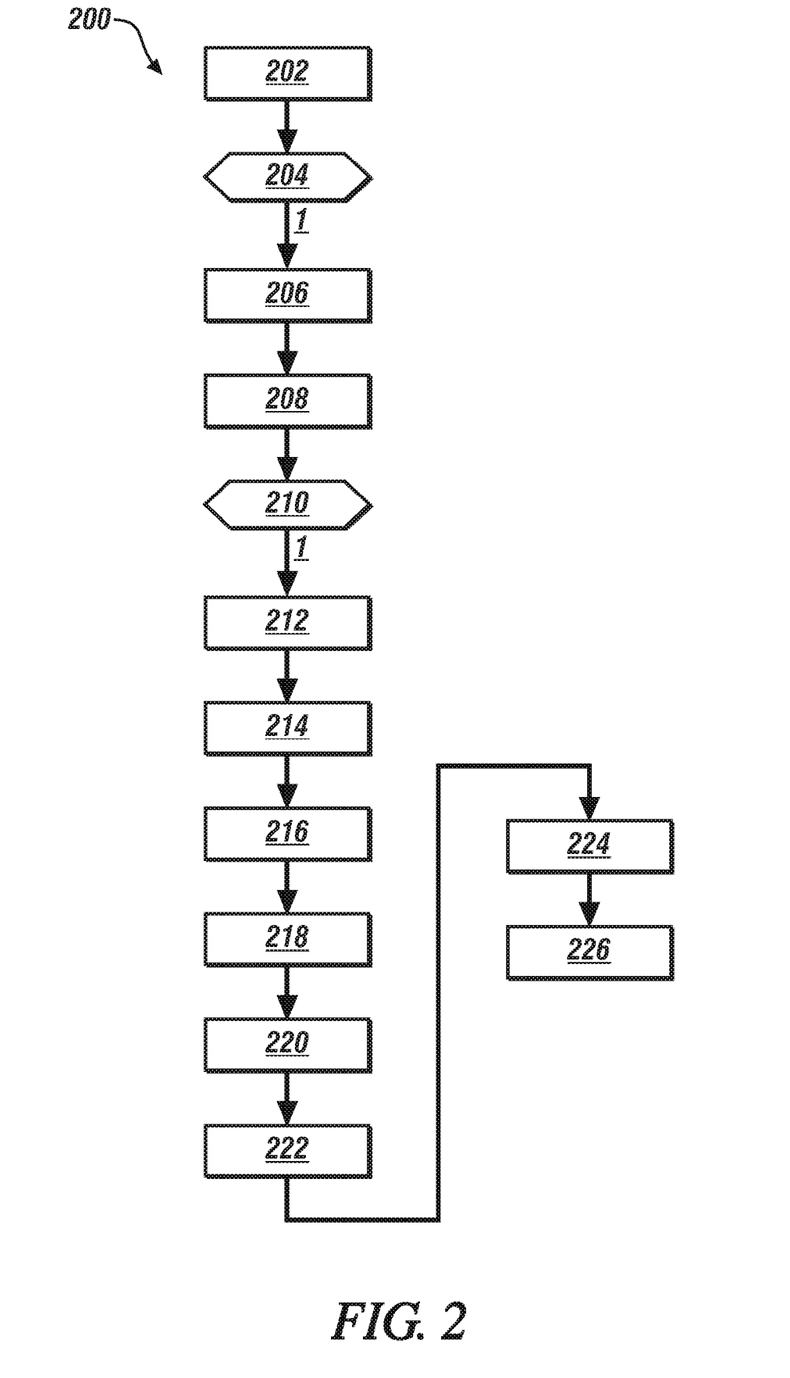
FIG. 2 illustrates a braking/range shift process that can be executed to control operation of a vehicle including a multi-mode powertrain system that transfers torque to a ground wheel in response to an output torque request, in accordance with the disclosure.

FIG. 2 schematically shows a braking/range shift process 200 executed to control operation of a vehicle including a multi-mode powertrain system that transfers torque to a ground wheel in response to an output torque request. Table 2 is provided as a key to FIG. 2 wherein the numerically labeled blocks and the corresponding functions are set forth as follows.

TABLE 2

| BLOCK | BLOCK CONTENTS |
|---|---|
| 202 | Operate powertrain system responsive to output torque request |
| 204 | Braking requested |
| 206 | Execute powertrain braking |
| 208 | Command transmission shift to target range and select preferred transmission shift path |
| 210 | Preferred transmission shift path include pseudo-gear operation |
| 212 | Off-load OG clutch |
| 214 | Ramp in changes in output torque and brake torque |
| 216 | Deactivate OG clutch |
| 218 | Operate in target pseudo-gear range |
| | Synchronize OC clutch elements |
| 220 | Activate OC clutch |
| 222 | Operate in the target transmission range |
| 224 | Set long-term clutch capacity of the OC clutch to a suitable large state |
| 226 | Execute output torque/brake torque swap |

The powertrain system operates in response to an output torque request with the transmission operating in a transmission range by activating one or more of the clutches to effect propulsion (202). As previously described, output torque refers to magnitude and direction of torque at the output member of the transmission, and differs from tractive torque, which is the magnitude of torque applied at drive wheels of vehicle. Differences between the output torque and the tractive torque are due to torque multiplication through driveline elements, if any, and due to magnitude of friction braking, if any. Powertrain braking refers to torque applied by the powertrain at the output member of the transmission that is transferred through a driveline to resist vehicle movement, and is associated with regenerative braking. Friction braking or wheel braking refers to mechanical braking force applied to one of more vehicle wheels, preferably through a hydraulic circuit. Vehicle braking can be accomplished using one or both powertrain braking and friction braking, and is referred to herein as a blended braking system.

The output torque request includes operator-commanded acceleration torque input from an accelerator pedal and operator-commanded braking torque input from a brake pedal. During operation, when an operator requests or commands braking (204)(1), powertrain braking can be executed (206). There are operating conditions which may preclude powertrain braking operation, and operation of the braking/range shift process 200 ends under such conditions.

During operation that includes powertrain braking in response to an output torque request that includes vehicle braking, there can be a command to change the transmission range, which includes executing a transmission shift from an initial range to a target transmission range (208). This includes selecting a preferred shift path to achieve the target transmission range. There may be multiple candidate shift paths to execute a shift to a target transmission range, with each portion of a shift path associated with activating an oncoming (OC) clutch or deactivating an off-going (OG) clutch. By way of example with reference to the powertrain system described in FIG. 1, a shift from EVT Mode 2 to EVT Mode 1 may include a first candidate shift path through Gear 1, i.e., M2-G1-M1, and a second candidate shift path through pseudo-gear 1 (pG1), i.e., M2-pG1-M1. Selecting a preferred shift path may be based upon factors associated with electric power consumption and hydraulic pressure management. When the preferred shift path to achieve the target transmission range includes one of the pseudo-gear ranges as an intermediate range, operation of the braking/range shift process 200 continues (210). Otherwise, execution of the transmission shift occurs without executing the braking/range shift process 200.

Shift execution includes managing operations of the engine, torque machines, and transmission output member. Prior to entering operation in the target pseudo-gear range, which includes offloading an activated clutch, torque control routines for the transmission output torque, engine, and torque machines are informed that the torque carrying capacity of the OG clutch is to be off-loaded. This can be accomplished by setting a long-term clutch capacity of the OG clutch equal to zero (212).

The information that the long-term clutch capacity of the OG clutch is set equal to zero is conveyed to control routines for determining the output torque, the engine torque and the motor torques. An output torque management routine calculates a new minimum output torque (To Min) constraint which reflects the long-term clutch torque capacity of the OG clutch. The minimum output torque is set equal to an output torque that would yield an OG clutch torque equal to long-term clutch torque capacity of the OG clutch, i.e., zero. This minimum output torque is to set a commanded minimum output torque for operation in the torque pseudo-gear range. However, instantaneously offloading the clutch would instantaneously increase the output torque up to the commanded minimum output torque in the target pseudo-gear range, which may negatively affect driveability because friction brake torque is employed to make up for the loss in powertrain braking through the output member, and the vehicle operator would likely sense a sudden changeover from powertrain braking to friction braking due to differences in the powertrain and friction braking systems. Thus, it is preferable to execute an output torque/brake torque swap over some finite amount of time to permit closed-loop control systems to accommodate differences in torque management calculations and execution latencies in the control systems for the powertrain and friction braking systems. Executing an output torque/brake torque swap over some finite amount of time includes applying mechanical braking torque to reduce output torque from the transmission to off-load torque from the OG clutch. In systems that are unable to perform closed loop control on the vehicle acceleration, the likelihood that the operator will notice the changeover is proportional to the rate (Nm/sec) at which the changeover takes place. It can be shown that the torque error, i.e., what the operator perceives, is proportional to the rate at which the changeover takes place. This can be accomplished by ramping in changes in the minimum output torque to achieve the commanded minimum output torque in the pseudo-gear state (214).

Ramping in changes in the minimum output torque can be accomplished by stepping the minimum output torque up to a previously commanded output torque and ramping the output torque command to the commanded minimum output torque in the target pseudo-gear range. The ramp rate is preferably governed by calibrations that are set to values which will yield a desirably slow torque changeover to a state that includes less powertrain braking and more friction braking. The reduction in powertrain braking is achieved by reducing regenerative braking capacity, which necessarily reduces the magnitude of the commanded output torque from the transmission, which is a negative output torque when operating with powertrain braking. As the magnitude of the commanded output torque decreases, the magnitude of torque applied by the mechanical brakes increases to increase the friction braking force and compensate for the reduction in magnitude of the output torque. A reduction in the powertrain braking reduces magnitude of reactive torque across the OG clutch. When the reactive torque of the OG clutch is zero, the OG clutch is deactivated, i.e., commanded to an open state (216). The reactive torque of the OG clutch can be determined using modeling, estimation, direct measurement or other suitable schemes.

The transmission operates in the pseudo-gear range when the OG clutch is deactivated to synchronize elements of the OC clutch (216). The pseudo-gear range includes a direct coupling between engine torque and output torque, and the regenerative capacity is dictated by the difference between the commanded minimum output torque in the pseudo-gear range and the accelerator pedal torque. By way of example, the accelerator pedal torque may be negative when the vehicle speed is greater than 10 mph and the accelerator pedal position is at 0% position, i.e., not applied.

The blended braking system compensates for a difference between an operator braking torque request, i.e., the brake pedal position mapped to a braking torque request, and a regenerative capacity of the powertrain system by commanding activation of the friction brakes. During operation in the pseudo-gear range, speeds of elements are controlled to synchronize the OC clutch and reduce its slip speed to zero. This process can take some amount of time, and may be in the range of 500 ms or longer (218).

Upon synchronizing the OC clutch, the OC clutch is activated by applying hydraulic pressure (220). Activating the OC clutch by applying hydraulic pressure includes some amount of delay caused by buildup of hydraulic pressure as the torque capacity of the clutch is ramped up, with attendant controls upon the torque management to minimize torque disruptions.

The powertrain system operates in the target transmission range to transfer torque to the driveline when the OC clutch is activated (222), which includes informing the torque control routines for the transmission output torque, engine, and torque machines that the torque carrying capacity of the OC clutch is large, which is accomplished by setting a long-term clutch capacity of the OC clutch equal to a suitable state (224).

A new minimum output torque constraint is determined that reflects the torque carrying capacity of the OC clutch, which causes the minimum output torque constraint to increase in magnitude in the negative direction. Thus the regenerative braking capacity also increases. An output torque/brake torque swap is again executed over some finite amount of time with the commanded output torque adjusted coincident with adjustments to the mechanical braking force in a manner that ensures that total braking force responsive to the operator request is achieved and an acceptable driveability is met (226). The commanded output torque increases to increase magnitude of powertrain braking and thus increase amount of recovered electric energy, and reaches a limit that is based upon the output torque request, torque security concerns and vehicle stability requirements.

Figure 3:
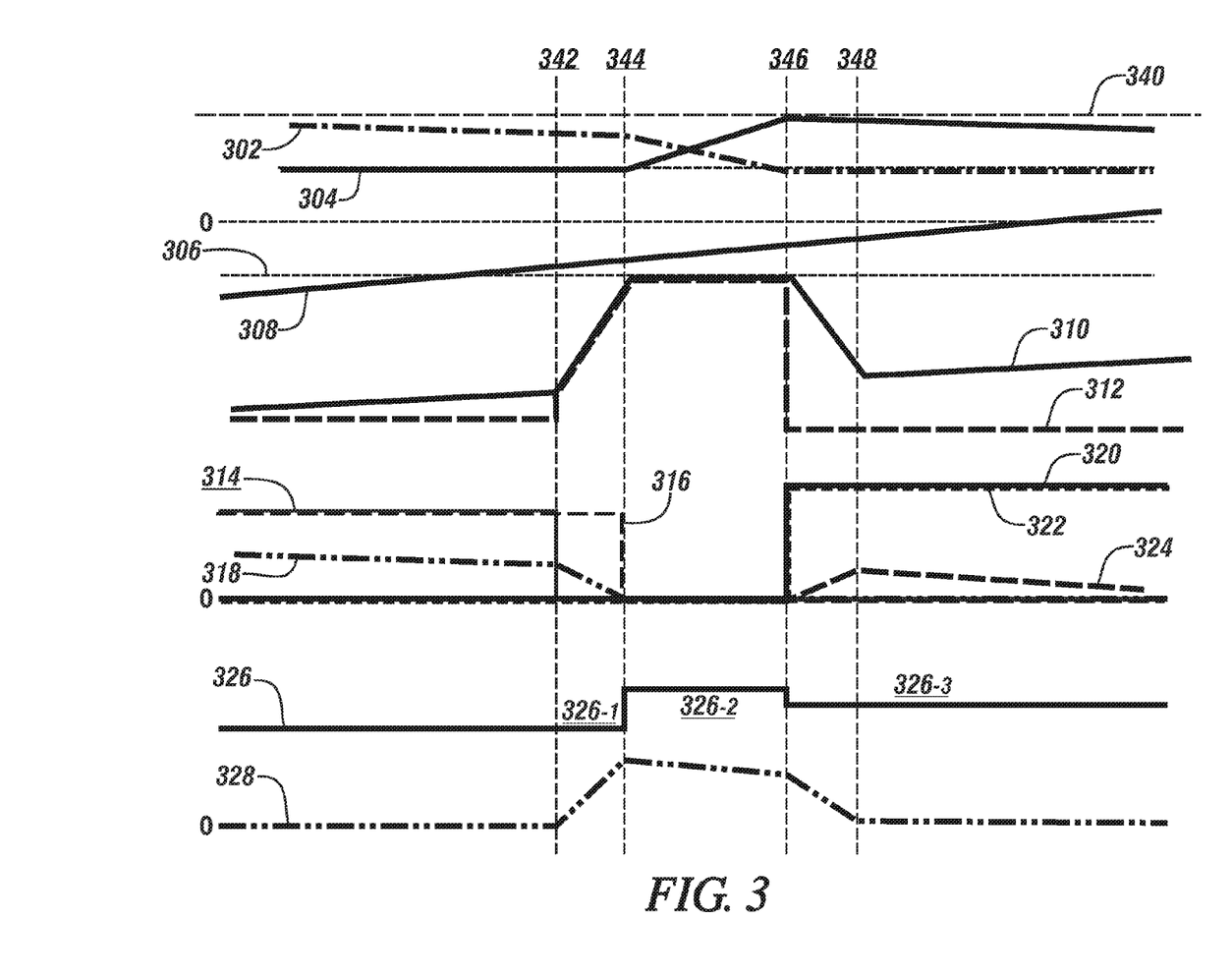
FIG. 3 illustrates data from an embodiment of the multi-mode powertrain of FIG. 1 that is executing the braking/range shift process of FIG. 2, which includes controlling blended braking during a downshift that includes operating in an intermediate pseudo-gear transmission range, in accordance with the disclosure.

FIG. 3 graphically illustrates data from an embodiment of a multi-mode powertrain described with reference to FIG. 1 that is executing the braking/range shift process 200 described with reference to FIG. 2, which includes controlling blended braking during a downshift that includes operating in an intermediate pseudo-gear transmission range. The data includes a plurality of concurrent transmission operating parameters that are plotted in relation to time, which is shown on the horizontal x-axis 340. The transmission operating parameters include an OC clutch speed 302, an OG clutch speed 304, a minimum output torque in the target pseudo-gear state 306, an operator-commanded acceleration torque 308, a commanded output torque 310 that includes the operator-commanded acceleration torque and an operator-commanded braking torque, a minimum output torque constraint 312, a long-term clutch torque capacity of the OG clutch 314, an OG clutch torque command 316, an OG clutch reactive torque 318, a long-term clutch torque capacity of the OC clutch 320, an OC clutch torque command 322, an OC clutch reactive torque 324, a transmission range 326, and friction braking torque 328.

Prior to time 342, the powertrain system is operating in a first transmission range, e.g., mode 2 (M2) 326-1. At time 342, a change in the powertrain system commands a transmission shift to a target transmission range with a preferred transmission shift path that includes operation in a pseudo-gear range. The long-term clutch torque capacity of the OG clutch 314 immediately reduces to zero, the OG clutch reactive torque 318 ramps down in response, and the friction braking torque 328 increases to compensate. There is a commanded reduction in powertrain braking that is achieved by reducing regenerative braking capacity, which necessarily reduces the magnitude of the commanded output torque 310, which is a negative output torque when operating with powertrain braking. As the magnitude of the commanded output torque 310 decreases, the magnitude of torque applied by the mechanical brakes increases to increase the friction braking torque 328 and compensate for the reduction in magnitude of the output torque 310. A reduction in the powertrain braking reduces magnitude of reactive torque across the OG clutch 318.

At time 344, the OG clutch reactive torque 318 ramps down to zero and the OG clutch torque command 316 is reduced to zero to deactivate the OG clutch. The OG clutch slip speed 304 increases from a zero speed point and the system operates in the pseudo-gear range 326-2 to synchronize the elements of the OC clutch. Synchronizing the elements of the OC clutch is indicated by the clutch slip speed of the OC clutch 302 reducing towards zero. During this period, the operator's total braking torque request is achieved by a combination of powertrain braking and friction braking.

At time 346, the elements of the OC clutch are synchronized, and the long-term clutch torque capacity of the OC clutch 320 increases to a maximum level with the OC clutch torque command 322. The OC clutch reactive torque 324 increases as the magnitude of output torque increases. For a locked clutch, an increase in hydraulic pressure does not increase the reactive torque being transmitted by a clutch. Rather, for a locked clutch, an increase in hydraulic pressure increases the torque capacity of that clutch. The torque capacity of a locked clutch differs from the reactive torque that is present in the clutch. The reactive torque can be anywhere between zero and the torque capacity of the clutch. The magnitude of the commanded output torque 310 increases, indicating increasing powertrain braking. As the magnitude of the commanded output torque 310 increases, the friction braking torque 328 decreases. The powertrain system operates in the target transmission range, e.g., mode 1 (M1) 326-3 as the OC clutch reactive torque 324 increases.

At time 348, the friction braking torque 328 stops ramping. In this particular example, the powertrain capacity both prior to time 342 and after time 348 is large enough that the entire operating braking torque request can be satisfied through transmission output torque without a need for friction braking. Hence at time 348 the friction braking torque achieves zero. The powertrain system operates in the target transmission range responsive to the total braking torque request.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a multi-mode transmission configured to transfer torque among an internal combustion engine, torque machines and an output member, the method comprising:
    executing powertrain braking responsive to an operator-commanded brake pedal torque, the powertrain braking initially comprising torque transmitted through a first, initially engaged clutch and a second clutch;
    during the execution of the powertrain braking, executing a transmission shift comprising:
        maintaining the powertrain braking comprising the torque transmitted through the second clutch;
        unloading torque from and disengaging the first clutch;
        after disengaging the first clutch, engaging and loading torque upon a third, initially disengaged clutch, wherein the powertrain braking after the third clutch is engaged comprises torque transmitted through the second clutch and third clutch; and at a beginning of the execution of the transmission shift, increasing mechanical braking through an at-wheel friction brake to compensate for a loss in torque transmitted through the first clutch and the third clutch during the transmission shift.

2. The method of claim 1, wherein said transmission shift comprises a transmission range downshift.

3. The method of claim 1, wherein said transmission shift comprises a transmission range upshift.

4. The method of claim 1, wherein executing powertrain braking comprises employing regenerative braking.

5. The method of claim 1, wherein executing powertrain braking comprises employing torque created by the engine.

6. The method of claim 1, wherein executing powertrain braking comprises employing regenerative braking and employing torque created by the engine.

* * * * *